(12) United States Patent
Germano et al.

(10) Patent No.: US 7,311,181 B2
(45) Date of Patent: Dec. 25, 2007

(54) BEARING FOR A SHOCK ABSORBER ELEMENT OF A MOTOR VEHICLE

(75) Inventors: Francesco Germano, Bietigheim-Bissingen (DE); Maximilian Seibel, Sindelfingen (DE); Achim Schulz, Niefern-Oeschelbronn (DE); Georg Tardy-Tuch, Malmsheim (DE); Sven Bergholz, Elster (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 144 days.

(21) Appl. No.: 11/034,968

(22) Filed: Jan. 14, 2005

(65) Prior Publication Data
US 2005/0155829 A1   Jul. 21, 2005

(30) Foreign Application Priority Data
Jan. 15, 2004   (DE)   .................... 10 2004 003 132

(51) Int. Cl.
*F16F 9/00*   (2006.01)
(52) U.S. Cl. ................. 188/321.11; 267/293; 267/179; 280/124.147; 280/124.155
(58) Field of Classification Search ........... 188/321.11; 267/141, 141.1–141.7, 153, 220, 292, 293, 267/294, 179; 280/124.147, 124.155
See application file for complete search history.

(56) References Cited

U.S. PATENT DOCUMENTS

| | | | | |
|---|---|---|---|---|
| 4,175,771 A | * | 11/1979 | Muzechuk et al. | ... 280/124.155 |
| 4,465,296 A | * | 8/1984 | Shiratori et al. | ...... 280/124.155 |
| 4,486,028 A | * | 12/1984 | Tanahashi | ............ 280/124.155 |
| 4,798,370 A | * | 1/1989 | Inuzuka | ........................ 267/220 |
| 4,877,262 A | | 10/1989 | Tanahashi et al. | |
| 5,040,775 A | * | 8/1991 | Miyakawa | ................... 267/220 |
| 5,342,029 A | * | 8/1994 | Carter | ......................... 267/220 |
| 5,362,035 A | * | 11/1994 | Carter | ......................... 267/220 |
| 5,664,650 A | | 9/1997 | Kammel et al. | |

(Continued)

FOREIGN PATENT DOCUMENTS

DE           38 39 699 A1      7/1989

(Continued)

OTHER PUBLICATIONS

German Office Action Dated Oct. 20, 2005 (two (2) pages).

(Continued)

*Primary Examiner*—Robert A. Siconolfi
*Assistant Examiner*—Mariano Sy
(74) *Attorney, Agent, or Firm*—Crowell & Moring LLP

(57) ABSTRACT

A bearing for a shock absorber element of a motor vehicle via an elastomer element on a vehicle body is provided, whereby the bearing consists of a cover and a bearing plate to be mounted on the vehicle. The elastomer element is accommodated in a recess in the bearing plate. To create a bearing for a shock absorber element of a motor vehicle that is simple to manufacture and install, the elastomer element is arranged in a housing configured as a bearing plate and sealed by a cover. The cover is configured so that, in the installed state of the bearing plate, it is supported on the vehicle body. In the uninstalled state, however, the cover sits loosely on the bearing plate and the elastomer element, so that the elastomer element is essentially not under any prestress.

3 Claims, 3 Drawing Sheets

U.S. PATENT DOCUMENTS 6,588,780 B2 * 7/2003 Hayashi et al. ....... 280/124.147
6,616,160 B2 * 9/2003 Tadano ................ 280/124.147
6,640,942 B2 * 11/2003 Wakita .................. 188/321.11

FOREIGN PATENT DOCUMENTS

| DE | 43 26 197 A1 | 2/1994 |
| DE | 297 22 553 U1 | 4/1998 |
| DE | 197 19 301 A1 | 11/1998 |
| DE | 197 25 826 A1 | 12/1998 |
| DE | 199 59 839 A1 | 7/2000 |
| DE | 101 05 458 A1 | 8/2002 |
| EP | 0 268 393 A2 | 5/1988 |
| EP | 0 885 757 B1 | 12/1998 |
| EP | 1 380 452 A2 | 1/2004 |

OTHER PUBLICATIONS

European Search Report dated Aug. 18, 2006 including English Translation of relevant portion (Four(4) pages).

* cited by examiner

BEARING FOR A SHOCK ABSORBER ELEMENT OF A MOTOR VEHICLE

This application claims the priority of DE3 10 2004 003 132.0-21, filed Jan. 15, 2004, the disclosure of which is expressly incorporated by reference herein.

BACKGROUND OF THE INVENTION

The present invention relates to a bearing for a shock absorber element of a vehicle, and more particularly, to a bearing which consists of a cover and a bearing plate, mountable on the vehicle body, with the elastomer element being accommodated in an indentation in the bearing.

Unexamined German Patent 197 19 301 A1 has already disclosed a body-side bearing of a shock absorber, whereby the piston rod of a shock absorber is held in an elastic buffer material which is in turn accommodated by a bearing housing mounted on the vehicle body. The bearing housing is constructed in two parts according to one embodiment, with an upper shell being connected in a form-fitting manner by catch hooks to a bottom shell in the manufacturing of the bearing housing.

German Patent 101 05 458 A1 discloses that an elastomer element may be used for a connecting arrangement between a shock absorber element, a vehicle-wheel suspension and the vehicle body; this elastomer element is soft before assembly and is greatly compressed in the installed state. No intermediate elements should be present between the elastomer element and the plate metal of the body.

SUMMARY OF THE INVENTION

An object of this invention is to provide a bearing for a shock absorber element of a motor vehicle which can be manufactured and installed easily.

This object has been achieved according to this invention by providing that the elastomer element is arranged in a housing, which is configured as a bearing plate that is closed by a cover. In an advantageous manner, this arrangement may be premounted on the shock absorber element, which is part of a spring leg, thereby simplifying the bearing and assembly of the complete unit.

The bearing plate is covered by a cover which is supported on the vehicle body in the installed state of the bearing plate. In the uninstalled state, however, the cover sits only loosely on the bearing plate and the elastomer element so that the elastomer element is essentially not under prestress. As a result, the elastomer element is not prestressed during storage, e.g., of a preinstalled spring leg with the supporting bearing and thus no settling phenomena can occur. On the other hand, prestressing of the elastomer element is accomplished in assembly of the bearing plate without any additional measures because the cover is supported on the vehicle body and thus is brought into its final position by the assembly of the bearing plate on the vehicle body.

A holding mechanism can be provided between the cover and the bearing plate. This may be, for example, catch noses, strips or the like. The holding mechanism keeps the cover in the proper position on the bearing plate in the uninstalled state so it cannot be lost and thus presents the cover or elastomer element from becoming detached from the bearing plate during storage and transport.

The cover can be contoured on its side which faces the elastomer element so as to achieve a targeted pretension of the elastomer bearing in certain areas, For example, conical inside contours with which the elastomer bearing is prestressed in the radial direction are contemplated, as are corrugated inside contours which impart a higher prestress and thus a greater rigidity to the elastomer bearing in certain directions of movement.

Furthermore on its side facing the vehicle body, the cover may have a peripheral edge. This edge serves as a sealing lip to seal the opening which is usually provided in the vehicle body to accommodate and center the bearing. This seal is supplemented by the elastomer bearing so that on the whole a complete separation is achieved between the interior and exterior of the vehicle body. In this embodiment, it is particularly advantageous if the cover is made of a plastic material, because then a good sealing effect is achieved. To increase the rigidity of the cover, a metallic reinforcing plate can be provided on the cover and held preferably inside the edge. In this context, catches which hold the reinforcing plate in position may be provided on the inside of the edge.

When different covers are provided which differ in their internal contour or their height, as described above (which also leads to a difference in the prestress of the elastomer element), for better differentiability of the different covers, the cover should be identified with different colors, in particular by manufacturing them from plastics of different colors.

The cover may also be configured so that it equalizes inclined positions of the bearing plate with respect to the vehicle body, i.e., deviations from a parallel installation. To this end, the contact surface of the cover with the vehicle body is inclined at the same angle as the contact surface of the bearing plate.

The elastomer element usually consists of a fixed supporting piece, which is connected to the shock absorber element, and an elastic buffer element which surrounds the supporting piece at least to the extent that the buffer element is always provided between the supporting piece and the contact surfaces. To prevent twisting of the elastomer element in the bearing plate, protrusions are provided on the inside of the bearing plate, corresponding to recesses on the lateral surface of the elastomer element. Corresponding recesses are also provided in the supporting piece so that enough material of the buffer element is provided at all points between the supporting piece and the bearing plate and thus an elastic bearing is reliably ensured.

Finally, the supporting piece can provide with a twist lock on its connecting surface with the absorber element. In combination with the form of fit described above between the bearing plate and the elastomer element, this ensures twist-proof positioning of the absorber element, e.g., on a rod of a shock absorber with respect to the vehicle body. At the same time, in assembly of the bearing on the absorber element, assembly aids such as key surfaces may be omitted because the rod can be secured with the help of a nut over the bearing in fastening. In this context, it is advantageous if the twist lock consists of a protrusion in a borehole on the supporting piece and if the protrusion extends only over a portion of this borehole. Thus in assembly, first the supporting piece can be placed on the rod of the absorber, regardless of its angular position, and in a second step it can be positioned correctly by turning it, while the supporting piece is already mounted on the rod. The same thing applies when the supporting piece is to be inserted into a corresponding mold for encasing it in foam. Here again, the positioning procedure is simplified and, when inserted into the mold, the supporting piece can be positioned without running the risk that the supporting piece might slip down and fall into the mold when aligning the angular position.

BRIEF DESCRIPTION OF THE DRAWINGS

Other objects, advantages and novel features of the present invention will become apparent from the following detailed description of the invention when considered in conjunction with the accompanying drawings.

FIG. 3 is a main sectional view through a bottom part of a cover of the bearing, FIG. 4 is a main sectional view through an elastomer element of the bearing, FIG. 5 is a sectional view along line V-V in FIG. 4.

DETAILED DESCRIPTION OF THE DRAWINGS

Figure 1:
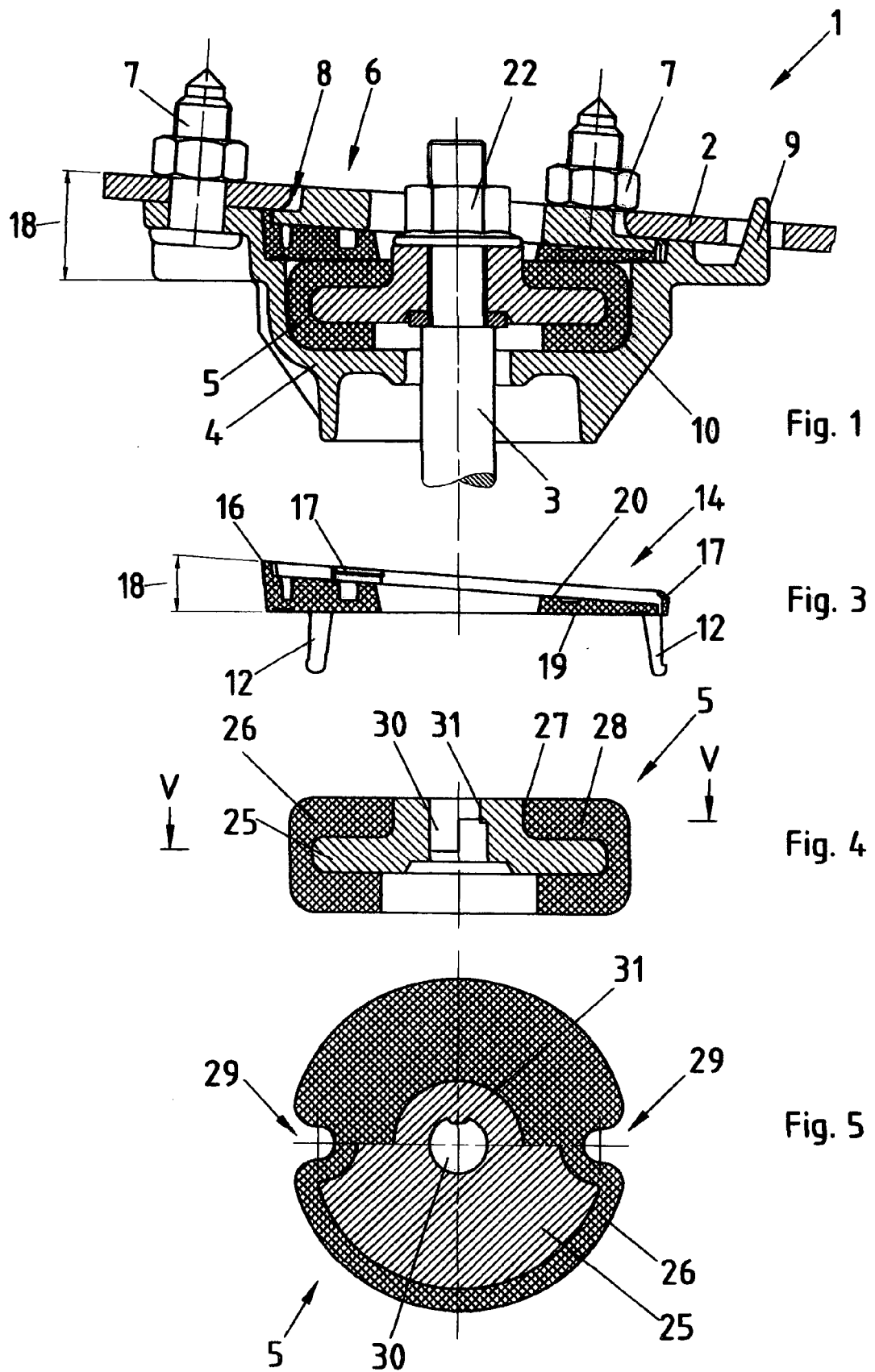
FIG. 1 is a main sectional view through a bearing installed on a vehicle body.

FIG. 1 is a main section through a bearing 1 which is mounted on a vehicle body, namely here a body plate 2. A shock absorber element of the vehicle, e.g., a spring leg (only a piston rod 3 of which is shown, is connected to the bearing 1. The bearing 1 consists of a bearing plate 4, an elastomer element 5 and a cover 6. The bearing plate 4 is provided on its circumference with screws 7 for mounting on the body plate 2. The body plate 2 has, in addition to openings to accommodate the screws 7, a central opening 8 through which parts of the bearing 1, namely a part of the cover 6 and parts of the piston rod 3 pass through. In addition, a catch 9 for installing the bearing 1 in the correct position in the motor vehicle is integrally molded on the side of the bearing plate 4.

The elastomer element 5 is accommodated in indentation 10 in the bearing plate 4, with the indentation 10 being closed at the top by the cover 6 so that the elastomer element 5 is held under tension in the illustrated installed state. In comparison with the uninstalled state, the elastomer element 5 is compressed by approximately 30% in its height direction, i.e., in the direction of piston rod 3.

The cover 6 is held in the bearing plate 4 without any additional mounting element and is positioned there through a receptacle opening 11. The bearing plate 4 is larger than the through-opening 8 in the body plate 2, so the cover 6 is supported on the body plate 2 in the installed state and is secured in this way between the bearing plate 4 and the body plate 2.

Figure 2:
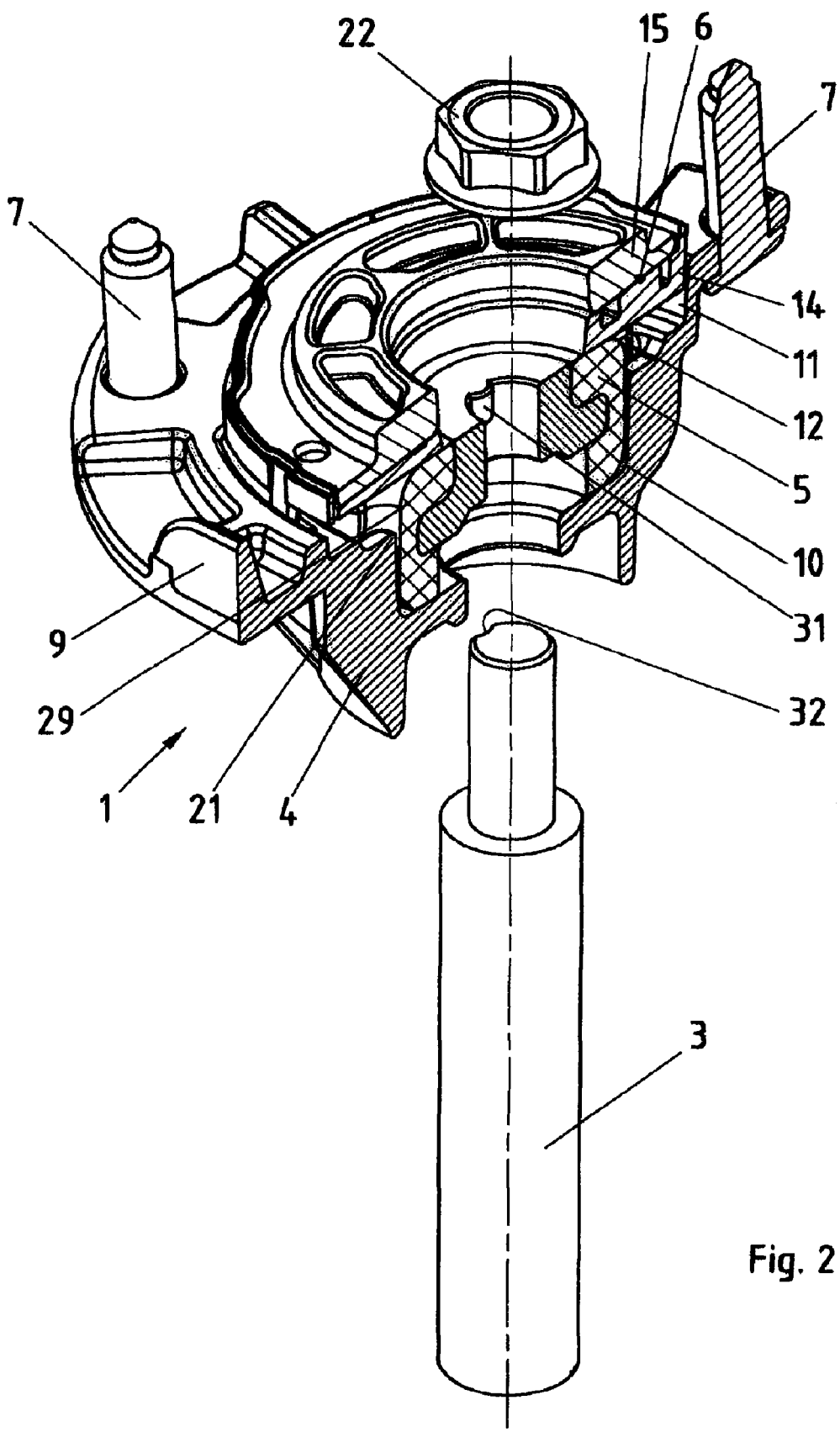
FIG. 2 is a partial sectional perspective view through an uninstalled bearing.
Figure 6:
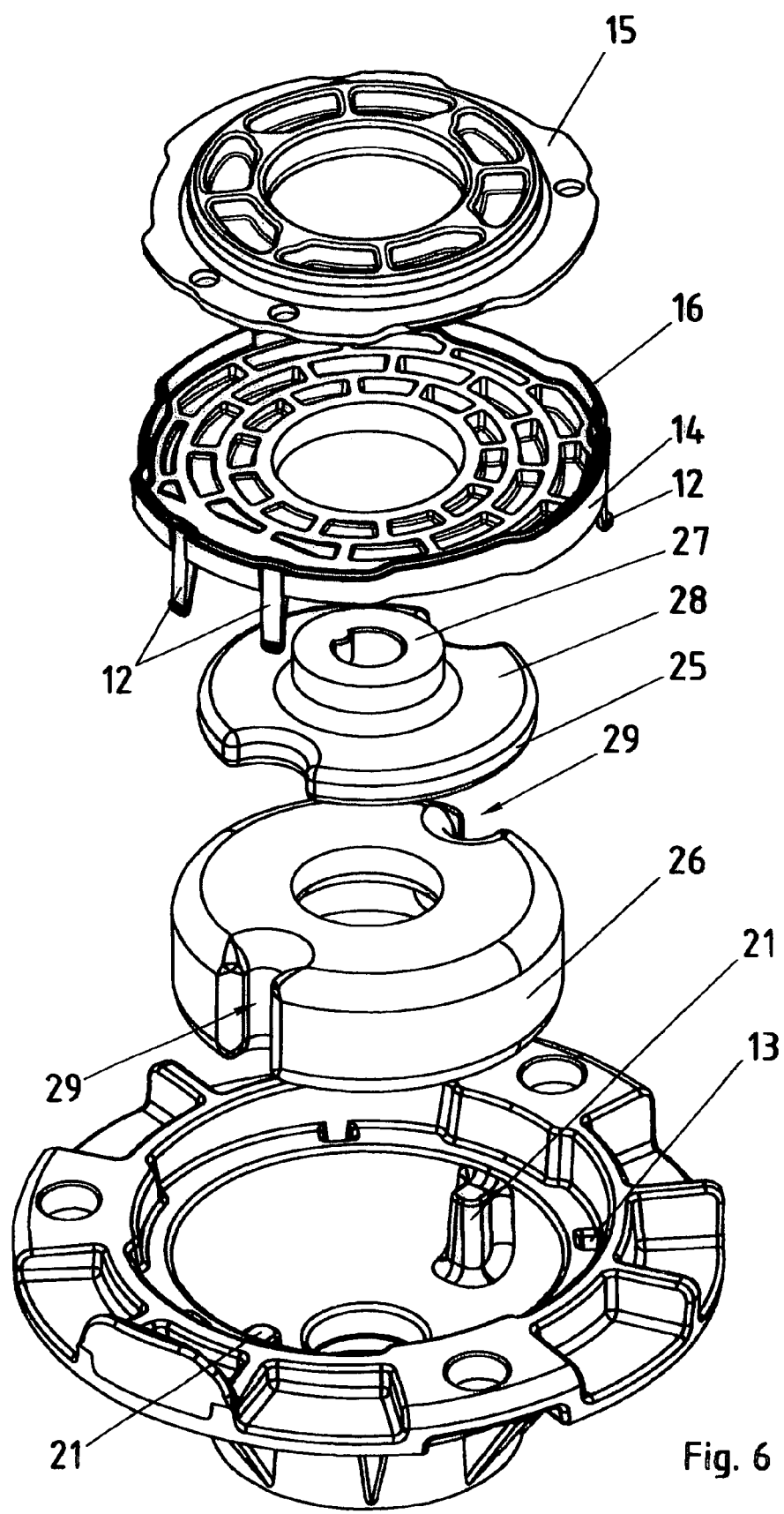
FIG. 6 is an exploded perspective view of the bearing according to the present invention.

FIG. 2 shows the bearing 1 in the uninstalled state. The elastomer element 5 here is not prestressed so that the cover 6 is lifted up out of the receptacle opening 11. To hold the cover 6 securely in the proper position on the bearing plate 4 so that it cannot be lost, catch hooks 12 are provided around the peripheral edge of the cover 6 (see also FIG. 6), engaging through corresponding openings 13 in the bearing plate 4 to hold the cover 6 in the position shown in FIG. 2.

The cover 6 is constructed in two parts in the illustrated embodiment. It consists of a bottom part 14 made of plastic (see FIG. 3) and a pressure plate 15. The pressure plate 15 is in contact with the body plate 2 and distributes the forces over its entire surface. The bottom part 14 is provided with a peripheral edge 16 to accommodate the pressure plate 15. Catches 17 which connect the pressure plate 15 to the bottom part 14 are integrally molded on the inside of the edge 16.

The edge 16 protrudes slightly above the pressure elate 15 and is thus in contact peripherally with the body plate 2 in the installed state of the bearing 1. The height of the bottom part 14 is sized so that the edge 16 is slightly higher than the receptacle opening 11. On its upper side, the edge tapers slightly so that the projecting area of the edge can be shaped at least partially when it comes in contact with the body plate 2. In this way a sealing effect is achieved around the edge 16.

As shown in FIG. 1, the bearing plate 4 is shaped so that the elastomer element 5 is set at an angle 18 to the body plate 2. The bottom part 14 is shaped accordingly so that its side 19 which faces the elastomer element 5 is inclined at the same angle 18 with respect to its side 20 facing the cover 6.

The elastomer element 5 consists of a fixed supporting piece 25 (FIG. 4) which is accommodated at its periphery on the outside in an elastic buffer element 26, made, for example, of polyurethane foam. The supporting piece 25 consists of a cylindrical central part 27 and a plate-shaped part 28. Two recesses 29 are provided on the outside circumference of the elastomer element 5 (FIG. 5) corresponding to the corresponding projections 21 in the indentation 10 in the bearing plate 4. As shown in FIG. 4, the recesses 29 are provided not only in the buffer element 26 but also in the supporting piece 26 so that the layer thickness of the buffer element 26 is not reduced even in the area of the recesses 29.

The cylindrical part 27 is provided with a central borehole 30 as the connecting surface with the absorber element, configured as illustrated to accommodate the rod 3. A protrusion 31 protrudes into the borehole 30 as a twist lock, but as indicated in FIG. 4, it extends only over an upper area of the length of the borehole 30. In the assembly of the bearing 1 on the rod 3, the rod 3 may be inserted first into the lower area of the borehole 30. By twisting the bearing 1 and thus also the elastomer element 5 on the piston rod 3, the protrusion 31 can then be positioned such that it engages in a corresponding groove 32 on the shock absorber rod 3. The same thing is true when the supporting piece 25 is to be inserted into a corresponding mold when encasing it in foam.

A nut 22 is provided for connecting the shock absorber rod 3 to the supporting piece 25. The countertorque required for tightening the nut 22 can then be applied to the bearing plate 4 because it is connected in a locked manner to the elastomer element 5 via the protrusions 21 and the recesses 29 and the elastomer element 5 is connected to the rod 3 via the protrusion 31 and the groove 32.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Bearing for a shock absorber element via an elastomer element on a vehicle body, comprising a cover, a bearing plate mountable on the vehicle body, the elastomer element being accommodated in an indentation in the bearing plate, wherein the elastomer element is configured to be held essentially without prestress between the cover and the bearing plate in an uninstalled state, whereas in an installed state the elastomer element is compressed between the cover and the bearing plate, so the cover is supported on the vehicle body, and wherein the elastomer element includes a fixed supporting piece and an elastic buffer element whereby the supporting piece is fixedly connected first to the absorber element and is accommodated on all sides in the elastic buffer element, the elastomer element has at least one recess on a circumference thereof, said recess corresponding to at least one protrusion in the indentation in the bearing plate, with the at least one recess being provided in the supporting piece, the bearing plate is configured with a contact surface on the vehicle body and a contact surface for the elastomer element that are non-parallel with respect to one another to define an angle greater than zero between a contact surface of the cover facing the vehicle body and a contact surface of the cover facing the elastomer element and a restraint is provided between the cover and the bearing plate, the cover having a peripheral edge on a side thereof facing the vehicle body and being contoured for targeted prestressing of the elastomer element in predetermined regions on a side thereof facing the elastomer element.

2. Bearing as claimed in claim 1, wherein the supporting piece is provided with a twist lock on its connecting surface with the absorber element.

3. Bearing as claimed in claim 2, wherein the twist lock includes a protrusion in a borehole in the supporting piece with the protrusion extending over only a portion of the borehole.

* * * * *